United States Patent [19]

Spetgang et al.

[11] 4,196,457
[45] Apr. 1, 1980

[54] MAGNETIC TAPE ROTARY HEADWHEEL ASSEMBLY WITH VENTING MEANS

[75] Inventors: Irwin Spetgang, Cherry Hill; James J. Brennan, Magnolia, both of N.J.

[73] Assignee: RCA Corporation, New York, N.Y.

[21] Appl. No.: 921,206

[22] Filed: Jul. 3, 1978

[51] Int. Cl.² .............................................. G11B 5/10
[52] U.S. Cl. ................................................... 360/129
[58] Field of Search ................... 360/129, 130, 84, 85, 360/107

[56] References Cited

U.S. PATENT DOCUMENTS 3,213,205  10/1965  Pfost ..................................... 360/107

Primary Examiner—Robert S. Tupper

Attorney, Agent, or Firm—Eugene M. Whitacre; Paul J. Rasmussen; John M. O'Meara

[57] ABSTRACT

A rotary headwheel assembly is described for magnetic recording on a magnetic tape. The headwheel includes a plurality of heads distributed about the periphery of the wheel and means for clamping the wheel to a rotary motor for rotating the wheel at high speeds and magnetically recording or playing signals on the tape. A headwheel cover is placed over the headwheel for providing the safety from fly away pieces from the headwheel or rotating assembly. The buildup of debris due to the close contact of the tape with the headwheel when the headwheel is rotating at high speed is prevented by narrow apertures in the cover and impeller means coupled to the rotating shaft of the headwheel for driving air current through the slots.

5 Claims, 6 Drawing Figures

MAGNETIC TAPE ROTARY HEADWHEEL ASSEMBLY WITH VENTING MEANS

BACKGROUND OF THE INVENTION

This invention relates to magnetic tape recording and, more particularly, to a rotating headwheel assembly operated at relatively high speeds.

As industry moves towards digital techniques (as opposed to analog) in electronics so has the magnetic tape recorder community. In some of these digital recorders, the rotary headwheel rotates at relatively high speeds even higher than the 240 RPS which is the broadcast standard. In an effort to provide safety, it is desirable to provide a cover to prevent the high speed rotating members including the pole pieces with potentially cutting edges on the periphery of the headwheel from flying off and causing injury. In operating at this and higher speeds particularly with the cover, a buildup of "gunk" or tape debris is developed upon the tip of the magnetic pole pieces. This "gunk" or tape debris in turn causes the pole pieces to lose intimate contact with the tape and thereby degrade the record/playback capability of the device.

SUMMARY OF THE INVENTION

An improved rotary headwheel assembly is disclosed for permitting high speed magnetic tape recording using a headwheel having magnetic heads on the periphery thereof and a rotating drive means for rotating the headwheel. The assembly includes a cover positioned over the headwheel for protecting personnel from fly away parts. Small apertures are placed in the cover to prevent the formation of debris on the heads and consequently degrade the record/playback capability of the device.

DESCRIPTION OF THE INVENTION

Figure 1:
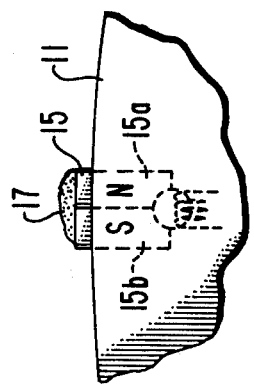
FIG. 1 is a sketch illustrating a magnetic head and tape debris.

Referring to FIG. 1, there is illustrated a portion of a headwheel 11 magnified for illustrative purposes. The headwheel 11 includes magnetic head 15 having pole pieces 15a and 15b in FIG. 1. When the magnetic heads are rotated at high speeds such as above 240 RPS (Revolutions Per Second) as in one particular type of digital recorder known as a "Versabit" which has recording speeds up to 400 RPS and higher, debris is loosened from the tape and as illustrated by 17 extends across the pole pieces. This buildup of "gunk" or tape debris causes the pole pieces to lose intimate contact with the tape to thereby degrade the record/playback capability of the device. It is believed that this deposit is particularly increased as speeds of the wheel is increased and is further accentuated by a cover that is placed over the headwheel for safety from parts flying off from rotating parts of the headwheel assembly. These parts include the pole pieces and balancing and mounting hardware. The heat generated is believed to be responsible for the loosening of the tape debris which is then deposited on the pole tips as illustrated in FIG. 1. This tape debris is believed to be caused by the friction on the tape loosening the mylar, metal oxide coating, lubricant and perhaps the binder. One solution to the problem may be to remove the cover but this is unacceptable for safety reasons since the high speed rotating members with potentially cutting edges on the peripheries may be dangerous. Although the problem is more acute at these high rotating speeds, it is evident that even at the broadcast standard of 240 RPS, this buildup has occurred.

Figure 2:
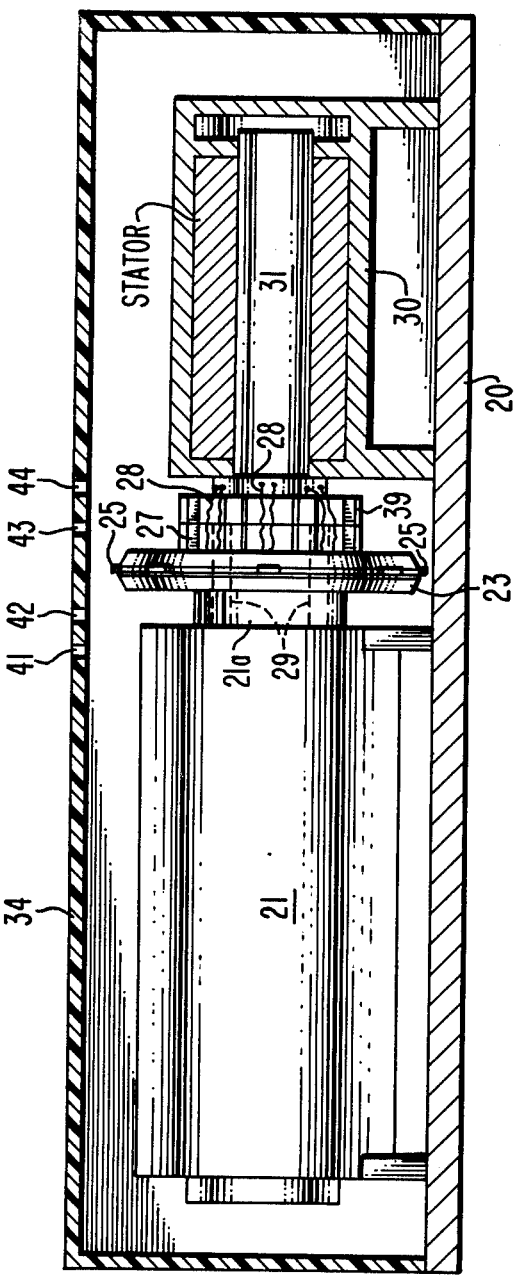
FIG. 2 is a sketch of the headwheel assembly with a portion of the cover removed and the rotary transformer removed for illustrative purposes.
Figure 3:
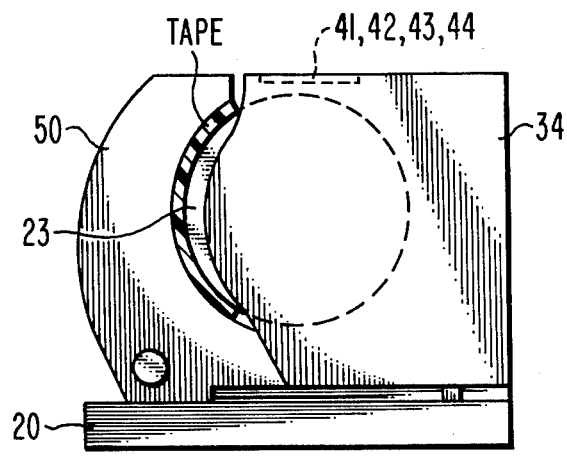
FIG. 3 is an end view of the headwheel assembly with cover in place.
Figure 4:
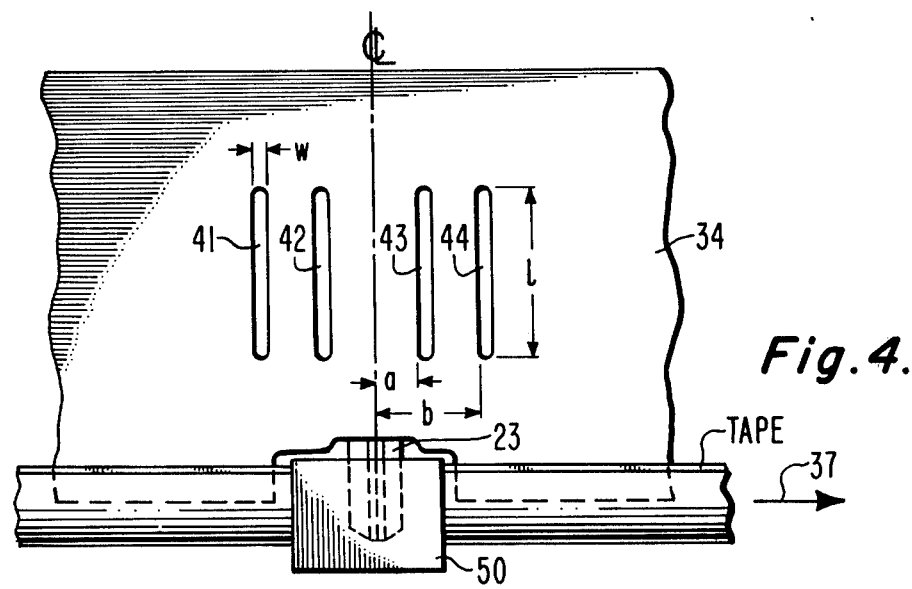
FIG. 4 is a top plan view of a portion of the assembly in FIG. 2.

Referring to FIG. 2, there is illustrated a quadruplex type of headwheel assembly including a motor 21 rotating the headwheel 23. The headwheel 23 has a plurality of magnetic heads 25 distributed about the periphery thereof like in FIG. 1. The headwheel 23 is mounted to the rotating shaft 21a of the motor 21, by a headwheel clamp 27 using screws 29 illustrated in dashed lines. The rotor 31 of rotary transformer 30 is mounted to the clamp 27 by screws 36. (See FIG. 6) The signals are coupled from the magnetic heads or to the magnetic heads via wires 28, extending from the headwheel 23 to the rotor portion 31 of a rotary transformer 30. The rotary portion 31 of the rotary transformer 30 is mounted to the headwheel clamp 27 and is rotated therewith. A tape guide 50 holds the magnetic tape against the headwheel as shown in FIGS. 3 and 4. A headwheel cover 34 of Lexan (Polycarbonate) material, (Sold by General Electric of 1 Plastics Ave., Pittsfield, Mass. 01201) covers the periphery of headwheel 23 (except that portion covered by guide 50) and a substantial portion of the entire assembly leaving space for the tape 32 to pass between the headwheel 23 and guide 50. See FIGS. 3 and 4. The cover 34 blankets the motor 21 and the rotary transformer. The headwheel assembly as described herein is a quadruplex type of assembly wherein as the tape 32 is pulled longitudinally is indicated by arrow 37 in FIG. 4, transverse recordings are provided to the tape via the magnetic heads 25 on high speed headwheel 23.

The solution described herein for preventing the debris being built up as discussed in connection with FIG. 1 is provided by narrow apertures 41, 42, 43, 44, slit in the cover above the headwheel on the side of the cover opposite the base 20. Referring to FIGS. 2, 3, 4 and 5, there is illustrated the cover 34. The cover 34 extends above the head 25 with the apertures 41 and 42 extending to the motor side of the headwheel 23 and the apertures 43 and 44 to the rotary transformer side of the headwheel in a direction parallel to the plane of the headwheel and orthogonal to the shaft 21a of the motor 21 and the rotary transformer 30.

Figure 5:
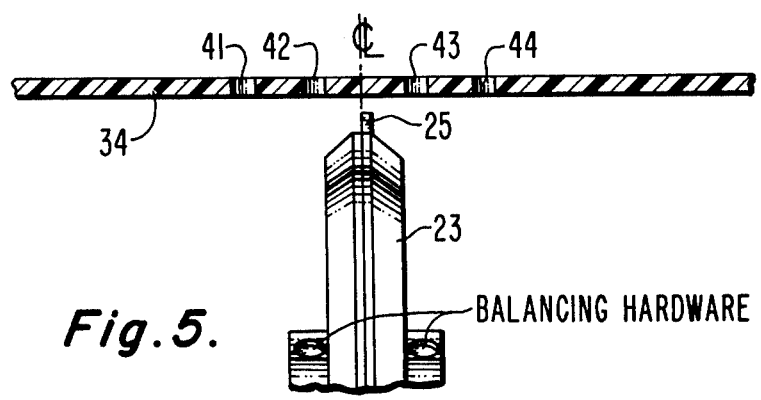
FIG. 5 is a sketch illustrating the region near the headwheel in FIG. 2.

Referring to FIGS. 4 and 5, the apertures 41 thru 44 are about 1 inch long (l=1 inch) and about 0.062 inches in width (w) which are smaller than any of the balancing hardware which may be associated with the headwheel on either side thereof for balancing the headwheel. Slots 42 and 43 are each spaced a distance (a in FIG. 4) along the cover 0.188 inch from the center line of the headwheel. Slots 41 and 44 are each spaced a distance (b in FIG. 4) along the cover of 0.438 inches from the center line of the headwheel.

Figure 6:
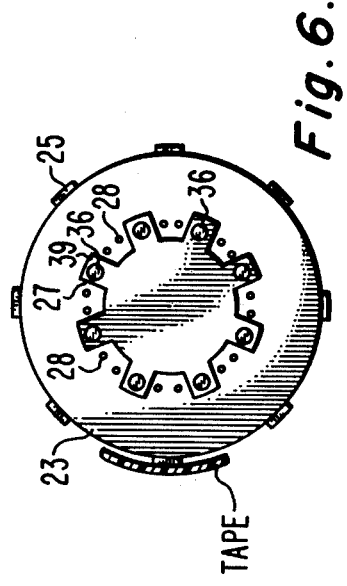
FIG. 6 illustrates the end view of the headwheel clamp and rotor mount flange.

FIG. 6 illustrates the end view of the headwheel clamp 27 and the rotor flange 39. In order to permit the coupling wires to extend from the headwheel 23 to the rotor, the headwheel clamp 27 and the flange 39 of the rotor 31 are notched as illustrated in FIG. 6 leaving a plurality of protruding members. The headwheel clamp 27 and the rotor flange 30 rotate at high speed and due to the notched configuration act as an impeller action to draw air up through the apertures 41, 42, 43 and 44 in the cover 34. It is believed that by this means the slots not only provide a means of exhaustion debris from under the cover but, because of their cooling effects, they actually prevent the debris from being generated in the first place.

What is claimed is:

1. A magnetic head assembly for relatively high speed recording on magnetic tape comprising:
    a headwheel having distributed thereon spaced magnetic heads,
    means for guiding the tape in close contact with the heads,
    drive means coupled to said headwheel for rotating said headwheel at high speeds,
    cover means mounted over the headwheel and the rotating portions of the assembly for protecting personnel from fly away parts, said heads when rotated at relatively high speeds having debris formed thereon, and
    means including apertures through said cover in the region near the headwheel and spaced from the tape guide for venting the headwheel through said cover to thereby prevent debris from forming on said heads.

2. The combination of claim 1 including impeller means coupled to said drive means for moving air through said apertures.

3. The combination of claim 2 wherein said impeller means also functions to clamp the headwheel to the drive means.

4. The combination of claim 1 wherein said apertures are narrow slits in the cover on either side of the headwheel but not directly above the headwheel.

5. In a rotary headwheel assembly of the type including a headwheel having distributed about the periphery magnetic heads containing magnetic pole pieces for magnetic recording of magnetic tapes passed thereover in close contact with the tape, rotating drive means for rotating said headwheel, said headwheel rotating at relatively high speed, said headwheel having a cover over rotating parts of the assembly to protect operators from flying pieces, said magnetic heads having formed thereon tape debris at said high speeds which in turn causes the pole pieces to lose intimate contact with the tape and thereby degrade the record/playback capability of the device, the improvement therein for eliminating the buildup of debris around the pole pieces and for further protecting from fly away pieces of the headwheel and associated balancing and mounting hardware comprising:
    said cover having narrow apertures therethrough extending near the headwheel and spaced from the tape guide for venting the headwheel near the region where the magnetic heads make contact with the tape,
    said apertures being sufficiently narrow to prevent any of the balancing and mounting hardward of said headwheel from flying through said apertures, and
    impeller means coupled to said rotating drive near said headwheel for moving air through said apertures.

* * * * *